(12) United States Patent
Oishi

(10) Patent No.: US 9,403,970 B2
(45) Date of Patent: Aug. 2, 2016

(54) STYRENE BASED RESIN COMPOSITION, FORMED PARTICLE THEREOF, AND OPTICAL ELEMENT

(71) Applicant: CANON KABUSHIKI KAISHA, Tokyo (JP)

(72) Inventor: Emi Oishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/349,646

(22) PCT Filed: Sep. 26, 2012

(86) PCT No.: PCT/JP2012/075586
§ 371 (c)(1),
(2) Date: Apr. 3, 2014

(87) PCT Pub. No.: WO2013/051588
PCT Pub. Date: Apr. 11, 2013

(65) Prior Publication Data
US 2014/0249258 A1     Sep. 4, 2014

(30) Foreign Application Priority Data
Oct. 6, 2011    (JP) .................................. 2011-222069

(51) Int. Cl.
| | | |
|---|---|---|
| *C08K 9/04* | (2006.01) | |
| *C08K 3/36* | (2006.01) | |
| *C08K 9/02* | (2006.01) | |
| *G02B 1/04* | (2006.01) | |
| *C08L 25/14* | (2006.01) | |
| *C08L 25/10* | (2006.01) | |
| *C08L 25/12* | (2006.01) | |

(52) U.S. Cl.
CPC ... *C08K 9/04* (2013.01); *C08K 3/36* (2013.01); *C08K 9/02* (2013.01); *G02B 1/04* (2013.01); *C08L 25/10* (2013.01); *C08L 25/12* (2013.01); *C08L 25/14* (2013.01)

(58) Field of Classification Search
None
See application file for complete search history.

(56) References Cited

U.S. PATENT DOCUMENTS

| | | | |
|---|---|---|---|
| 2005/0069780 A1* | 3/2005 | Kinouchi et al. | ............. 429/317 |
| 2005/0153187 A1 | 7/2005 | Chiba et al. | |
| 2011/0020730 A1* | 1/2011 | Mizuno et al. | ................ 429/483 |

FOREIGN PATENT DOCUMENTS

| | | |
|---|---|---|
| JP | 2006007657 A | 1/2006 |
| JP | 2006-291197 A | 10/2006 |

OTHER PUBLICATIONS

STN record for Snowtext 10.*

* cited by examiner

*Primary Examiner* — Marc Zimmer
(74) *Attorney, Agent, or Firm* — Canon U.S.A., Inc., IP Division

(57) ABSTRACT

A styrene based resin composition having a low linear thermal expansion coefficient and high formability, a formed article thereof, and an optical element made from the formed article are provided. The formed article is produced by forming a styrene based resin composition containing a styrene based resin and silica particles, wherein the number average particle diameter of primary particles of the silica particles is 0.5 nm or more and 40 nm or less, and the content of the silica particles is 40 percent by volume or more and 75 percent by volume or less relative to a total of the styrene based resin and the silica particles.

10 Claims, No Drawings

STYRENE BASED RESIN COMPOSITION, FORMED PARTICLE THEREOF, AND OPTICAL ELEMENT

TECHNICAL FIELD

The present invention relates to a styrene based resin composition, a formed article thereof, and an optical element. In particular, the present invention relates to a styrene based resin composition having a very low linear thermal expansion coefficient, a formed article thereof, and an optical element.

BACKGROUND ART

In general, substances expand by being heated and, in particular, it is known that organic resin materials have large linear thermal expansion coefficients. For example, in the case where a member made from an organic resin material is used in a device typified by a precision optical system or the like, a large change in size of the member due to a temperature change may cause deviation in the position of the optical system. In the case where a member used for the precision optical system is produced from only the organic resin material, it is desired that the linear thermal expansion coefficient thereof is $20 \times 10^{-6}/°$ C. or less.

In a method which is known as a method to solve this problem and which is disclosed in PTL 1, an organic-inorganic composite material is produced by adding an inorganic material, e.g., inorganic particles, in an organic resin material, so as to decrease the linear thermal expansion coefficient of the composite material. Concretely, it is disclosed that an inorganic filler, e.g., $SiO_2$, $Al_2O_3$, or MgO, having a number average particle diameter of 1 nm or more and 100 nm or less is mixed into a thermosetting resin, e.g., an epoxy resin or a phenol resin. Furthermore, it is also disclosed that a resin composition having a linear thermal expansion coefficient of $20 \times 10^{-6}/°$ C. or less is thereby formed.

CITATION LISTS

Patent Literature

PTL 1 Japanese Patent Laid-Open No. 2006-291197

SUMMARY OF INVENTION

Technical Problem

In the method disclosed in PTL 1, in which the linear thermal expansion coefficient is decreased by adding inorganic fine particles to the organic resin material, the linear thermal expansion coefficient of $20 \times 10^{-6}/°$ C. or less is achieved by adding inorganic fine particles to the resin.

However, in the case where the linear thermal expansion coefficient of the organic resin is high, it is necessary to add large amounts of inorganic fine particles. For example, in the case where polystyrene having a linear thermal expansion coefficient of $82 \times 10^{-6}/°$ C. is used as the organic resin and the linear thermal expansion coefficient is decreased to $20 \times 10^{-6}/°$ C. or less, even when silica having a small specific gravity is used, it is necessary that the amount of addition is about 86 percent by weight (76 percent by volume), according to simple calculation on the basis of a volume fraction. Addition of large amounts of inorganic fine particles causes a problem in that bulk formability of a thermoplastic resin is impaired significantly. Therefore, it is difficult in practice to obtain a formed body having a linear thermal expansion coefficient of $20 \times 10^{-6}/°$ C. or less.

In the case where the organic resin is the thermosetting resin, as described in PTL 1, deformation and deviation in the position of a formed article increase because of cure shrinkage of the resin. In addition, curing takes a long time in general and, thereby, a forming cost along with curing also increases.

The present invention provides a styrene based resin composition having a low linear thermal expansion coefficient and high formability, a formed article thereof, and an optical element made from the formed article.

Solution to Problem

A formed article according to the present invention is produced by forming a styrene based resin composition containing a styrene based resin and silica particles, wherein the number average particle diameter of primary particles of the above-described silica particles is 0.5 nm or more and 40 nm or less, and the content of the above-described silica particles is 40 percent by volume or more and 75 percent by volume or less relative to a total of the styrene based resin and the silica particles.

A styrene based resin composition according to the present invention contains the above-described styrene based resin and silica particles.

An optical element according to the present invention is made from the above-described formed article.

Advantageous Effects of Invention

According to the present invention, a styrene based resin composition having a low linear thermal expansion coefficient and high formability, a formed article thereof, and an optical element made from the formed article are provided.

The formed article according to the present invention exhibits a linear thermal expansion coefficient of $20 \times 10^{-6}/°$ C. or less in the temperature range of at least 20° C. to 60° C. The linear thermal expansion coefficient thereof is very low and, therefore, the formed article is suitable for use as a low expansion member and a temperature-compensating member used for precision optical devices, e.g., optical fibers, lenses, and mirrors.

DESCRIPTION OF EMBODIMENTS

The embodiments according to the present invention will be described below in detail. Although various limitations are placed on the embodiments described below in order to execute the present invention, the scope of the invention is not limited to the embodiments described below.

A styrene based resin composition according to the present invention is made from a composition containing a styrene based resin and silica particles. The number average particle diameter of primary particles (average primary particle diameter) of the above-described silica particles is 0.5 nm or more and 40 nm or less, and the content of the above-described silica particles is 40 percent by volume or more and 75 percent by volume or less relative to a total of the styrene based resin and the silica particles.

The individual components constituting the styrene based resin composition according to the present invention will be described below.

Styrene Based Resin

The styrene based resin used for the styrene based resin composition according to the present invention is not specifically limited, and thermoplastic styrene based resins produced by polymerizing various styrene compounds may be used. Here, the term "styrene based resin" refers to a polymer produced by polymerizing at least one type of vinyl aromatic hydrocarbon serving as a raw material and a copolymer produced by polymerizing at least two types of vinyl aromatic hydrocarbons. Examples of vinyl aromatic hydrocarbon compounds include a styrene monomer, α-alkyl-substituted styrenes, e.g., α-methyl styrene, nuclear alkyl-substituted styrenes, e.g., vinyltoluene, vinylxylene, p-tert-butyl styrene, and ethylstyrene, and nuclear halogen-substituted styrenes, e.g., monochlorostyrene, dichlorostyrene, p-bromostyrene, 2,4,5-tribromostyrene, and 2,4,6-tribromostyrene. The polymer of the styrene based resin used for the present invention can include a general-purpose polystyrene (GPPS) from the viewpoint of transparency.

The weight average molecular weight of the polystyrene resin is preferably 100,000 or more and 1,000,000 or less, and more preferably 100,000 or more and 500,000 or less.

Besides this, the styrene based resins include copolymers, e.g., acrylonitrile-butadiene-styrene (ABS), acrylonitrile-styrene (AS), and polymethacrylic styrene (MS). The styrene based resins may be used alone or a plurality of types may be used in combination.

The styrene based resin used for the present invention may be produced by a known method, for example, emulsion polymerization, suspension polymerization, solution polymerization, or bulk polymerization. As necessary, a catalyst, an antioxidant, or the like may be used in the production.

The styrene based resin according to the present invention may contain additives within the bound of not impairing the intrinsic effects. Examples of additives include a thermal stabilizer, an antioxidant, a light stabilizer, an ultraviolet absorber, a plasticizer, a release agent, a flame retardant, an antistatic agent, an organic coloring agent, and an impact resistance improver. These additives may be used alone or a plurality of types may be used in combination.

Silica Particles

Silica particles used for the present invention may be either commercially available silica particles or produced silica particles. The method for manufacturing silica particles is not specifically limited and any known method may be employed. Examples of the manufacturing methods include dry methods, e.g., a synthesis method through a vapor phase reaction, and wet methods, e.g., a synthesis method in which sodium silicate is used as a raw material and an aqueous solution thereof is neutralized to obtain a precipitate and a synthesis method by utilizing a hydrolysis-dehydration reaction of silicon alkoxide (sol-gel method). The resulting silica particles in either a state of powder after drying or a state of silica sol dispersed in an organic solvent or the like may be used in mixing with the styrene based resin. The organic solvent used for the silica sol can be a solvent having a high solvent power for the styrene based resin and other additives. Examples thereof include methyl ethyl ketone and toluene.

The particle diameters of silica particles are not specifically limited, but the number average particle diameter of primary particles is 0.5 nm or more and 40 nm or less, and particularly preferably 5 nm or more and 30 nm or less. As the particle diameter increases, an effect of decreasing the linear thermal expansion coefficient of the resin composition is impaired. The reason for this is believed to be that the effect of decreasing the linear thermal expansion coefficient due to an interaction with the styrene based resin is reduced along with a decrease in surface area of silica particles. Furthermore, optical scattering occurs and, thereby, a problem occurs in the case where the styrene based resin composition according to the present invention is used for an optical device. In addition, reduction in transparency is brought about. Meanwhile, if the particle diameter is too small, contribution of rigidity of the particle decreases, so that a low linear thermal expansion property may be lost.

Particle surfaces of the silica particles used for the present invention may be modified with various functional groups. Presence or absence of surface modification and the type of the functional group applied to the surface may be selected appropriately in accordance with a predetermined linear thermal expansion coefficient and the dispersibility of the silica particles. A method in which the linear thermal expansion coefficient of an organic resin material is decreased by adding inorganic particles to the material is well known. However, in the present invention, it was found that the linear thermal expansion coefficient of the resulting resin composition was changed depending on a functional group present on silica particle surfaces. It is believed that the amount of decrease in linear thermal expansion coefficient is changed because of differences in interactions between the styrene based resin and the silica particles or between silica particles or differences in dispersion state or morphology between the styrene based resin and the silica particles. The functional groups present on the silica particle surfaces may include at least one type of known group. Examples thereof include alkyl groups, e.g., a methyl group, an ethyl group, a n-propyl group, an i-propyl group, a n-butyl group, an i-butyl group, a t-butyl group, a hexyl group, and a hexadecyl group, halogenated alkyl groups, e.g., a chloromethyl group, a chloropropyl group, a fluoromethyl group, and a fluoropropyl group, a vinyl group, a styryl group, an acrylic group, a methacrylic group, a glycidyl group, an epoxycyclohexyl group, an isocyanate group, an amino group, a ureide group, a mercapto group, a sulfide group, and hydroxyl groups, e.g., a silanol group. Most of all, silica particles having at least one type of silanol group, amino group, and hexadecyl group as the functional group present on particle surfaces can be employed because the linear thermal expansion coefficient is further decreased.

The silica particles having the silanol group or the amino group on particle surfaces can be employed because the linear thermal expansion coefficient is made to be a value in the vicinity of zero or a negative value. The silica particles having the hexadecyl group on particle surfaces can be employed because the linear thermal expansion coefficient is made to be a large negative value.

As for a method for surface-modifying the silica particles, a method in which modification or reforming with a silicon compound is performed by a known method through the use of a reaction with the silanol group of the surface may be selected. Here, the silicon compound refers to at least one type of silicon-containing compound which has the above-described group and which is selected from the group consisting of alkoxysilanes, chlorosilanes, silylamines, hydrosilanes, and polyorganosiloxanes.

In the case where particles are mixed into an organic resin material, in general, the particles are subjected to a surface treatment in order to improve the dispersibility. However, in order to decrease the linear thermal expansion coefficient to a great extent, the surfaces can be covered with the silanol group. Surfaces of silica particles not surface-treated with an organic surface treatment agent are covered with the silanol group and are suitable for use.

Mixing of Styrene Based Resin with Silica Particles

Mixing of the styrene based resin with silica particles may also be performed by a method in which the styrene based resin is dissolved into a solvent, mixing with the silica particles is performed sufficiently, and the solvent is removed. The styrene based resin is dissolved into the solvent to produce a styrene based resin solution. The type of the solvent is not specifically limited insofar as the solvent dissolves the styrene based resin and the silica particles are mixed without an occurrence of phase separation. Examples thereof include aprotic polar solvents, e.g., tetrahydrofuran and methyl ethyl ketone, and nonpolar solvents, e.g., toluene and xylene. In particular, the solvent is removed after mixing of the styrene based resin with the silica particles and, therefore, a solvent having a low boiling point, e.g., tetrahydrofuran or toluene, can be used.

Mixing of the silica particles with the styrene based resin solution may be performed by mixing the silica particles directly into the styrene based resin solution or by mixing silica sol dispersed in a solvent in advance into the styrene based resin solution. Any amount of solvent is employed. Therefore, the solvent may be added appropriately insofar as the solvent can be removed finally. At least one type of solvent may be used alone or in combination. In particular, after the styrene based resin solution is mixed with the silica particles, the mixed solution can be homogenized with various known dispersing apparatuses. Examples of dispersing apparatuses include homogenizers, ultrasonic treatment apparatuses, roll mills, ball mills, vibrating ball mills, beads mills, attritors, disk mills, sand mills, colloid mills, jet mills, and paint shakers. At least two types of dispersion treatments with these apparatuses may be combined.

The solvent in the mixed solution of the silica particles and the styrene based resin may be removed by adjusting the temperature and the degree of vacuum through heating or decompression. The amount of remaining solvent is minimized because the remaining solvent causes a decrease in linear thermal expansion coefficient and a malfunction in forming. Concretely, it is desirable that the remaining solvent is removed in such a way as to become 0.5% or less, preferably 0.1% or less, and further preferably 0.01% or less relative to a total mass.

Styrene Based Resin Composition

The styrene based resin composition according to the present invention contains a styrene based resin and silica particles. The solvent has been removed from the styrene based resin composition according to the present invention.

The content of silica particles in the styrene based resin composition according to the present invention is 40 percent by volume or more and 75 percent by volume or less, and preferably 40 percent by volume or more and 70 percent by volume or less relative to a total of the styrene based resin and the silica particles. In the present invention, if the content of silica particles is 40 percent by volume or more, the linear thermal expansion coefficient of the formed article decreases significantly. An increase in content of silica particles is effective at decreasing the linear thermal expansion coefficient. However, as the content increases, the brittleness increases and the formability is degraded. Therefore, the content is preferably 75 percent by volume or less. Even when the content is the same, the linear thermal expansion coefficient may change depending on the dispersion state of silica particles. In this regard, the content of silica particles in the styrene based resin may change from the content at the time of charge depending on the steps of mixing and drying. Consequently, the content of silica particles in the present invention refers to a numerical value on a percent by volume basis converted from the amount of residue of a formed article, on a percent by weight basis, measured with a thermogravimetric analysis (TGA) apparatus, where the temperature is raised to 800° C.

The content of the styrene based resin contained in the styrene based resin composition according to the present invention is 25 percent by volume or more and 60 percent by volume or less, preferably 30 percent by volume or more and 60 percent by volume or less relative to a total of the styrene based resin and the silica particles.

Formed Article

The formed article according to the present invention is produced by forming the above-described styrene based resin composition.

The styrene based resin composition according to the present invention is formed into any shape by being pressurized under heating, e.g., injection forming and heat press forming. If the heating temperature in the forming is too low, a predetermined shape is not produced. If the heating temperature is too high, an increase in the linear thermal expansion coefficient is brought about. Therefore, the range of 150° C. to 300° C. is favorable. The forming pressure is not specifically limited, but 50 MPa or more is preferable to transfer the shape.

The linear thermal expansion coefficient in the range of 20° C. to 60° C. of the formed article according to the present invention is $20 \times 10^{-6}/°$ C. or less (where a negative linear thermal expansion coefficient is included). The formed article according to the present invention may have a negative linear thermal expansion coefficient. The linear thermal expansion coefficient of the formed article according to the present invention is preferably $-40 \times 10^{-6}/°$ C. or more and $20 \times 10^{-6}/°$ C. or less, and more preferably $-32 \times 10^{-6}/°$ C. or more and $-10 \times 10^{-6}/°$ C. or less. The symbol "−" expresses a negative linear thermal expansion coefficient. If the linear thermal expansion coefficient is more than $20 \times 10^{-6}/°$ C., changes in size due to temperature changes increase and unfavorably, deviation in the position of a member is brought about.

Optical Element

An optical element according to the present invention is made from the above-described formed article. Concrete examples of optical elements include interior and exterior parts, e.g., lenses, prisms, filters, mirrors, and polarizing elements, used in precision optical systems.

EXAMPLES

The present invention will be described below further concretely with reference to examples and comparative examples. The present invention is not limited to these examples.

Example 1

Tetrahydrofuran serving as a solvent was added to polystyrene (trade name G9504; produced by PS Japan Corporation, weight average molecular weight 282,000), and mixing was performed at ambient temperature sufficiently, so that a polystyrene/tetrahydrofuran solution having a resin content of 5 percent by weight was obtained.

Subsequently, 50 g of 5-percent by weight polystyrene/tetrahydrofuran solution was added in several batches to 3.3 g of silica particles (trade name AEROSIL 300 produced by Nippon Aerosil Co., Ltd., average primary particle diameter 7 nm, surface group is silanol group) while mixing was performed. Mixing was further performed through an ultrasonic treatment. After tetrahydrofuran was air-dried to some extent, a solvent was removed by performing a heat treatment in a vacuum furnace at about 250° C. for 4 hours, so that a styrene based resin composition was obtained.

The styrene based resin composition was formed by heat press. Novec-EGC 1720 (trade name, produced by Sumitomo 3M Limited) serving as a release agent was dropped on a surface of a press-forming mold having a diameter of 15 mm and wiping was performed sufficiently. Styrene based resin composition 1 was filled into the press-forming mold, and heating up to 250° C. was performed in a small hot-press machine (produced by As One Corporation). After the temperatures of an upper surface and a lower surface of the small hot-press machine reached 250° C., 110 MPa of load was applied, and decompression was performed by natural releasing while cooling to 100° C. was performed slowly. The load was removed completely at 100° C., and a coin-shaped formed article was obtained by being released from the mold.

Comparative Example 1

Comparative example 1 was a formed article of a styrene based resin not containing silica particles. Pellets of polystyrene (trade name G9504; produced by PS Japan Corporation) were filled into a press-forming mold, and a formed article was obtained by heat press in the same manner as that in Example 1.

Example 2

A styrene based resin composition was obtained under the same condition as the condition in Example 1 except that the amount of addition of silica particles in Example 1 was changed to 4.6 g. The resulting styrene based resin composition was subjected to forming in the same manner as that in Example 1, so as to obtain a formed article.

Example 3

A styrene based resin composition was obtained under the same condition as the condition in Example 1 except that the silica particles were changed to AEROSIL OX50 (trade name, produced by Nippon Aerosil Co., Ltd., average primary particle diameter 40 nm, surface group is silanol group) and the amount of addition was changed to 7.5 g in Example 1. The resulting styrene based resin composition was subjected to forming under the same condition as that in Example 1, so as to obtain a formed article.

Example 4

A styrene based resin composition was obtained under the same condition as the condition in Example 1 except that the amount of addition of silica particles in Example 3 was changed to 14.1 g. The resulting styrene based resin composition was subjected to forming in the same manner as that in Example 1, so as to obtain a formed article.

Example 5

A styrene based resin composition was obtained under the same condition as the condition in Example 1 except that the silica particles were changed to AEROSIL RA200H (trade name, produced by Nippon Aerosil Co., Ltd., average primary particle diameter 12 nm, surface group is amino group) and the amount of addition was changed to 5.8 g in Example 1. The resulting styrene based resin composition was subjected to forming under the same condition as that in Example 1, so as to obtain a formed article.

Example 6

A styrene based resin composition was obtained under the same condition as the condition in Example 1 except that the amount of addition of silica particles in Example 5 was changed to 7.5 g. The resulting styrene based resin composition was subjected to forming in the same manner as that in Example 1, so as to obtain a formed article.

Example 7

A styrene based resin composition was obtained under the same condition as the condition in Example 1 except that the amount of addition of silica particles in Example 5 was changed to 10.0 g. The resulting styrene based resin composition was subjected to forming in the same manner as that in Example 1, so as to obtain a formed article.

Example 8

A styrene based resin composition was obtained under the same condition as the condition in Example 1 except that the silica particles were changed to AEROSIL R816 (trade name, produced by Nippon Aerosil Co., Ltd., average primary particle diameter 12 nm, surface group is hexadecyl group) and the amount of addition was changed to 3.3 g in Example 1. The resulting styrene based resin composition was subjected to forming under the same condition as that in Example 1, so as to obtain a formed article.

Example 9

A styrene based resin composition was obtained under the same condition as the condition in Example 1 except that the amount of addition of silica particles in Example 8 was changed to 14.1 g. The resulting styrene based resin composition was subjected to forming in the same manner as that in Example 1, so as to obtain a formed article.

Comparative Example 2

A styrene based resin composition was obtained under the same condition as the condition in Example 1 except that the amount of addition of silica particles in Example 3 was changed to 2.5 g. The resulting styrene based resin composition was subjected to forming in the same manner as that in Example 1, so as to obtain a formed article.

Comparative Example 3

A styrene based resin composition was obtained under the same condition as the condition in Example 1 except that the amount of addition of silica particles in Example 1 was changed to 0.83 g. The resulting styrene based resin composition was subjected to forming in the same manner as that in Example 1, so as to obtain a formed article.

Comparative Example 4

A styrene based resin composition was obtained under the same condition as the condition in Example 1 except that the amount of addition of silica particles in Example 1 was changed to 15.26 g. The resulting styrene based resin composition had poor formability and forming was not performed.

Evaluation

Method for Measuring Linear Thermal Expansion Coefficient

Three cycles of temperature load from 0° C. to 80° C. was applied with TMA (trade name TMA TA5000, produced by TA Instruments) and the linear thermal expansion coefficient in the range of 20° C. to 60° C. in the thickness direction was calculated. An expansion probe was used for the measurement of displacement.

Method for Measuring Content of Silica Particles

The content of silica particles was measured by using TGA (trade name TGA TA5000, produced by TA Instruments).

The content of silica particles in percent by weight was converted to the content of silica particles in percent by volume on the basis of the specific gravities of polystyrene and silica particles. The specific gravity of polystyrene was specified to be 1.04, and the specific gravity of silica particles was specified to be 2.00. The evaluation results of TMA and TGA are shown in Table 1. In the evaluation, each formed article was cut into a suitable size appropriately.

The evaluation results of formed articles in examples and comparative examples are shown in Table 1.

TABLE 1

| | Group on surface of particle | Number average primary particle diameter (nm) | Content of silica particles (percent by volume) | Linear thermal expansion coefficient (ppm/° C.) |
|---|---|---|---|---|
| Example 1 | silanol | 7 | 40.7 | −0.9 |
| Example 2 | silanol | 7 | 49 | −2.7 |
| Example 3 | silanol | 40 | 61.3 | 7.38 |
| Example 4 | silanol | 40 | 70.3 | −15.84 |
| Example 5 | amino | 12 | 49.1 | 12.28 |
| Example 6 | amino | 12 | 54.4 | −31.4 |
| Example 7 | amino | 12 | 57.9 | −7.15 |
| Example 8 | hexadecyl | 12 | 44.9 | −68.28 |
| Example 9 | hexadecyl | 12 | 70.9 | −113.54 |
| Comparative example 1 | — | — | 0 | 82.2 |
| Comparative example 2 | amino | 12 | 34.5 | 42.9 |
| Comparative example 3 | silanol | 7 | 12.3 | 53.3 |
| Comparative example 4 | silanol | 7 | 78 | forming was impossible |

As is ascertained from Table 1, the linear thermal expansion coefficient in the range of 20° C. to 60° C. of the formed article of the styrene based resin composition, in which the content of silica particles having the number average primary particle diameter of 0.5 nm or more and 40 nm or less was 40 percent by volume or more and 75 percent by volume or less was $20 \times 10^{-6}$/° C. or less.

It was ascertained that in the case where silica particles having the silanol group on the surface and having the number average primary particle diameter of 6.5 nm or more and 7.4 nm or less was used, the linear thermal expansion coefficients of the styrene based resin composition having a content of silica particles of 40 percent by volume or more and 50 percent by volume or less were negative values close to zero.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-222069, filed Oct. 6, 2011, which is hereby incorporated by reference herein in its entirety.

INDUSTRIAL APPLICABILITY

The styrene based resin composition according to the present invention and the formed article thereof have low linear thermal expansion coefficients and, therefore, are utilized for low expansion members and temperature-compensating members used for precision optical devices, e.g., optical fibers, lenses, and mirrors.

The invention claimed is:

1. A formed article produced by forming a styrene based resin composition comprising a styrene based resin and silica particles,
   wherein the number average particle diameter of primary particles of the silica particles is 0.5 nm or more and 40 nm or less,
   the content of the silica particles is 40 percent by volume or more and 75 percent by volume or less relative to a total of the styrene based resin and the silica particles, and
   wherein the silica particles have amino group or hexadecyl group on surfaces.

2. The formed article according to claim 1, wherein the silica particles have an amino group on the surfaces.

3. The formed article according to claim 1, wherein the silica particles have a hexadecyl group on the surfaces.

4. The formed article according to claim 1, wherein the weight average molecular weight of the styrene based resin is 100,000 or more and 1,000,000 or less.

5. The formed article according to any claim 1, wherein the linear thermal expansion coefficient in the range of 20° C. to 60° C. of the formed article is $-40 \times 10^{-6}$/° C. or more and $20 \times 10^{-6}$/° C. or less.

6. The formed article according to claim 1, wherein the linear thermal expansion coefficient in the range of 20° C. to 60° C. of the formed article is a negative linear thermal expansion coefficient.

7. The formed article according to claim 1,
   wherein the silica particles have a silanol group on the surfaces and the number average particle diameter of primary particles is 6.5 nm or more and 7.4 nm or less, and
   the content of the silica particles is 40 percent by volume or more and 50percent by volume or less relative to a total of the styrene based resin and the silica particles.

8. The formed article according to claim 1, wherein the silica particles have an amino group on the surfaces.

9. An optical lens, prism, filter, mirror, or polarizing element made of a formed article
   wherein the formed article is produced by forming a styrene based resin composition comprising a styrene based resin and silica particles,
   wherein the number average particle diameter of primary particles of the silica particles is 0.5 nm or more and 40 nm or less,
   the content of the silica particles is 40 percent by volume or more and 75 percent by volume or less relative to a total of the styrene based resin and the silica particles, and
   wherein the silica particles have at least any one of silanol group, amino group and hexadecyl group on surfaces.

10. A styrene based resin composition comprising a styrene based resin and silica particles, wherein the number average particle diameter of primary particles of the silica particles is 0.5 nm or more and 40 nm or less, the content of the silica particles is 40 percent by volume or more and 75percent by volume or less relative to a total of the styrene based resin and the silica particles, and wherein the silica particles have amino group or hexadecyl group on surfaces.

* * * * *